US006395223B1

(12) United States Patent
Schuster et al.

(10) Patent No.: US 6,395,223 B1
(45) Date of Patent: May 28, 2002

(54) METHOD OF MAKING A FLUX, A BRAZING WIRE, AND A BRAZING PASTE

(75) Inventors: Jerry L. Schuster, Newfields; Daniel J. Jossick, Exeter, both of NH (US)

(73) Assignee: Omn. Technologies Corporation, Epping, NH (US)

( * ) Notice: Subject to any disclaimer, the term of this patent is extended or adjusted under 35 U.S.C. 154(b) by 0 days.

(21) Appl. No.: 09/934,100

(22) Filed: Aug. 21, 2001

Related U.S. Application Data

(63) Continuation-in-part of application No. 09/603,317, filed on Jun. 24, 2000, now Pat. No. 6,277,210.
(60) Provisional application No. 60/141,165, filed on Jun. 25, 1999.

(51) Int. Cl.[7] .............................................. B23K 35/363
(52) U.S. Cl. .......................................... 419/65; 148/24
(58) Field of Search ................................ 419/65; 148/24

(56) References Cited

U.S. PATENT DOCUMENTS 4,482,607 A * 11/1984 Neelameggham et al. .. 428/403
5,781,846 A * 7/1998 Jossick .......................... 419/66
5,984,161 A * 11/1999 Koch et al. ................. 228/56.3

* cited by examiner

*Primary Examiner*—Daniel J. Jenkins
(74) *Attorney, Agent, or Firm*—Michael J. Persson; Lawson, Philpot & Persson, P.C.

(57) ABSTRACT

A method of making a brazing flux compound including the steps of dispensing a desired amount of each of a plurality of ingredients. Adding potassium bifluoride to a bowl and adding boric acid on top of the potassium bifluoride. Mixing the boric acid and potassium bifluoride to form a substantially smooth wet first paste. Adding potassium tetraborate to the first paste and mixing the potassium tetraborate with the first paste to form a substantially creamy second paste. Adding potassium fluoroborate to the second paste and mixing the potassium fluoroborate with the second paste to form a third paste. Adding potassium carbonate to the third paste and mixing until the potassium carbonate is completely dissolved thus forming a fourth paste. Heating the fourth paste for a predetermined time at a predetermined temperature such that the said fourth paste is substantially dried into a substantially solid flux and then reducing the substantially solid flux to a powder flux.

20 Claims, No Drawings

METHOD OF MAKING A FLUX, A BRAZING WIRE, AND A BRAZING PASTE

RELATED APPLICATIONS

This application is a Continuation-in-Part of co-pending U.S. patent application Ser. No. 09/603,317, filed on Jun. 24, 2000, now U.S. Pat. No. 6,277,210, which claims the priority of U.S. Provisional Patent Application Serial No. 60/141,165, filed on Jun. 25, 1999.

FIELD OF THE INVENTION

The present invention relates to the field of brazing and, in particular, to a method of making a flux for silver brazing that is non-corrosive and non-hygroscopic in nature, and to a flux cored silver brazing wire and silver brazing paste utilizing the same.

BACKGROUND OF THE INVENTION

For many years, metal parts have been joined using silver-based brazing compounds. As is well known in the art, it is necessary to prepare the surfaces to be joined prior to applying the brazing compounds in order to provide adhesion of the brazing compound to the surfaces to be joined. This preparation is typically performed by a flux material, which is applied to the joint and activated by the application of heat to the joint. Once activated, the flux thoroughly cleans the surfaces to the joined and removes any oxides that will degrade the strength of the brazed joint.

As they must aggressively clean the surfaces to be joined, fluxes have typically been highly corrosive and hygroscopic in nature. Accordingly, it is necessary in many applications to remove any residual flux or flux residue from the joined parts in order to prevent corrosion of the parts. This removal increases the overall costs of the parts, due to the additional process steps and the cost of waste disposal from the cleaning process. In addition, the waste generated by this cleaning is hazardous to humans and harmful to the environment.

Finally, because of their corrosiveness and affinity for absorbing water, many typical fluxes have not been adapted for use in flux cored wires. As this is the case, the use of these fluxes has necessitated the additional step of applying the flux in a paste form prior to heating and joining the parts. As was the case with the cleaning. step described above, the need to perform this additional step increases the overall cost of the joined parts.

Accordingly, there is a need for a flux for use with silver brazing compositions that effectively prepares the surfaces to be joined, is non-corrosive and non-hygroscopic and, accordingly, does not need to be cleaned from joined surfaces after they are joined, and may be formed into a powder for disposal within a flux cored wire.

SUMMARY OF THE INVENTION

The present invention is a silver brazing flux that is non-corrosive and non-hygroscopic in nature, and a method of making this flux. In its most basic form, the flux includes the following compounds in the following percentages by weight:

TABLE 1

Composition of Basic Flux Compound

| COMPOUND | PERCENTAGE BY WEIGHT |
| --- | --- |
| Potassium Fluoroborate | 21%–31% |
| Boric Acid | 21%–31% |
| Potassium Bifluoride | 19%–29% |
| Potassium Tetraborate | 15%–25% |
| Potassium Carbonate | 2.5%–4.5% |

In addition the above materials, the preferred flux includes boron in the range of 0.01% to 2.0% by weight. The addition of boron in these amounts is preferred as such an addition has been found to enhance the anti-oxidation properties of the flux. However, it is recognized that the flux will work satisfactorily without the addition of boron and, therefore, boron is not included in all embodiments.

In some embodiments, the flux is combined with deionized water, or other suitable binder materials, to form a flux paste. In other embodiments, the flux is mixed sand dried into a powder and dispensed within a silver based filler material using, for example, the process described in U.S. Pat. No. 5,781,846, which is incorporated herein by reference, to form a 5,781,846.

The preferred flux includes the following compounds in the following percentages by weight:

TABLE 2

Composition of Preferred Flux Compound

| COMPOUND | PERCENTAGE BY WEIGHT |
| --- | --- |
| Potassium Fluoroborate | 26.3% |
| Boric Acid | 26.3% |
| Potassium Bifluoride | 23.8% |
| Potassium Tetraborate | 20.2% |
| Potassium Carbonate | 3.3% |
| Boron | 0.2% |

The method of making the flux includes the following steps:

Dispensing the proper percentages of all ingredients by weighing, volume, or other art recognized means. This dispensing step may be performed prior to the mixing steps or contemporaneous with each mixing step.

Adding boric acid on top of potassium bifluoride.

Mixing the boric acid and potassium bifluoride at medium-low speed until a completely smooth wet paste is formed.

Adding potassium tetraborate and mixing, preferably at medium low speed;

Adding potassium fluoroborate and mixing, preferably at medium low speed;

Adding potassium carbonate to the paste and mixing until it is completely dissolved;

Adding boron and mixing, preferably at medium low speed;

Adding a non-reactive liquid, such a deionized water, alcohol, or the like, to each step of the mixture as it begins to stiffen in order to keep a loose, smooth consistency, similar to that of cake frosting, and scraping the sides and bottom of the mixing bowl as needed to keep the mix even.

Mixing the paste, preferably at medium speed.

Stopping the mixer and transferring the mixture into a container, such as a pan. The transferring step preferably involves transferring the mixture such that it fills the container to a depth of between about one inch and about two inches, as filling to this depth allows entrained moisture within the mixture to more easily be exhausted from the mixture during the subsequent heating step and also produces a solid flux that is more easily reduced to powder form.

Drying the mixture by placing the container into an oven preheated to between about 500 and about 700 degrees Fahrenheit and leaving the mixture within the oven for a period of between about two and six hours, such that substantially all moisture is dried from the mixture;

Removing the dried flux and reducing the size of the flux particles to a powder, such as by roll milling, hammer milling, crushing, pulverizing, or the like, and screening to a desired average particle size of between about 20 mesh and about 325 mesh.

The resulting flux powder is non-corrosive and non-hygroscopic, and is readily adapted for suspension within a paste or disposition within a brazing alloy to form a wire brazing composition.

Therefore, it is an aspect of the invention to provide a method of making a brazing flux that is non-corrosive.

It is a further aspect of the invention to provide a method of making a brazing flux that is non-hygroscopic.

It is a further aspect of the invention to provide a method of making a brazing flux that promotes reaction between materials during mixing that dries off moisture while causing dry materials to combine to form a paste material.

It is a further aspect of the invention to provide a method of making a brazing flux that prevents unwanted reactions between materials during mixing.

It is a further aspect of the invention to provide a method of making a brazing flux that does not leave a residue that must be cleaned from surfaces after they are joined.

It is a further aspect of the invention to provide a method of making a brazing flux that effectively prepares surfaces for joining.

It is a further aspect of the invention to provide a method of making a brazing flux that may be formed into a powder.

It is a further aspect of the invention to provide a method of making a brazing flux that may be combined with a silver brazing alloy to form wire brazing composition.

It is a still further aspect of the invention to provide a method of making a brazing flux that may be combined with a binder material to form a flux paste.

These aspects of the invention are not meant to be exclusive and other features, aspects, and advantages of the present invention will be readily apparent to those of ordinary skill in the art when read in conjunction with the following description, appended claims and accompanying drawings.

DETAILED DESCRIPTION OF THE INVENTION

The present invention is a silver brazing flux that is non-corrosive and non-hydroscopic in nature and a method of making the flux. As set forth in the summary section above, the flux is a mixture of potassium fluoroborate, boric acid, potassium bifluoride, potassium tetraborate, and potassium carbonate and, in some embodiments, boron. When combined in the percentages set forth above, the resulting flux provides excellent surface preparation characteristics and is both non-corrosive and non-hygroscopic.

In some embodiments, the flux is combined with deionized water, or other suitable binder materials, to form a flux paste. In these embodiments, the flux paste is applied to the faying surfaces prior to the application of heat, and is subsequently heated until it flows and wicks across the faying surfaces, effectively preparing the surfaces for joining. Once the surfaces are prepared, a solid wire of silver based brazing composition is brought into contact with the heated surfaces, causing the brazing composition to flow across the surfaces and, once cooled, to effectively join the surfaces together.

In other embodiments, the flux is mixed and dried into a powder and dispensed within a silver based filler material to form a wire brazing composition. In some such embodiments, the filler material may be formed into a sheath and filled using methods similar to those described in the inventors U.S. Pat. No. 5,781,846. In others, the filler material is formed with a notch, groove or other surface detail that allows the filler material to accepting the flux and allows the filler material and the flux to be formed into a U.S. Pat. No. 5,781,846. Regardless of the shape taken by the filler material prior to disposition of the flux, in each of these embodiments the faying surfaces are heated and the wire brazing composition is brought into contact with the heated surfaces, causing the flux to melt and flow and subsequently causing the brazing composition to melt and flow.

All embodiments of the flux may be utilized with all American Welding Society (AWS) standard industrial silver/copper/zinc alloys. Accordingly, the preferred brazing alloy will vary depending upon the particular application in which it will be used.

As noted above, the preferred flux includes the following compounds in the associated percentages by weight:

| COMPOUND | PERCENTAGE BY WEIGHT |
|---|---|
| Potassium Fluoroborate | 26.3% |
| Boric Acid | 26.3% |
| Potassium Bifluoride | 23.8% |
| Potassium Tetraborate | 20.2% |
| Potassium Carbonate | 3.3% |
| Boron | 0.2% |

The preferred method includes the following steps:

Weighing each solid and liquid ingredient in separate clean, dry containers.

Adding potassium bifluoride into a stainless steel mixing bowl and separating any clumps such that until only granules less than 300 microns in size remain;

Adding boric acid on top of the potassium bifluoride;

Mixing the boric acid and potassium bifluoride at medium-low speed until a completely smooth wet paste is formed;

Adding deionized water to the paste as it begins to stiffen in order to keep a loose, smooth consistency, similar to that of cake frosting, and scraping the sides and bottom of the mixing bowl as needed to keep the mix even;

Adding potassium tetraborate and mixing at medium low speed until the mixture becomes smooth and creamy, adding additional deionized water to the mixture as it beings to stiffen, and scraping the sides and bottom of the mixing bowl as needed to keep the mix even;

Adding potassium fluoroborate and mixing at medium to medium low speed until smooth, adding additional deionized water to the mixture as it beings to stiffen, and scraping the sides and bottom of the mixing bowl as needed to keep the mix even;

Adding potassium carbonate to the paste and mixing until it is completely dissolved;

Adding boron and mixing, preferably at medium low speed

Stopping the mixer, scraping the sides and bottom of the bowl and the mixer blade, mixing again at medium speed;

Stopping the mixer and pouring the mixture into a stainless steel pan;

Drying the mixture by placing the stainless steel pan into a pre-heated oven at approximately 650 degrees Fahrenheit for a period of about four hours such that substantially all moisture is dried from the mixture;

Removing the dried flux and milling to a powder and screening to a desired particle size of between about 40 mesh and about 200 mesh.

It has been found that the order in which the potassium bifluoride, boric acid and potassium tetraborate are added is important in obtaining the desired result. Namely, by adding these materials in this order, a smooth paste having the desired properties is formed, while adding in other orders does not produce the desired smoothness or properties. However, it is noted the order of addition of the remaining component compositions has no substantial effect on the final product and, therefore, the order of addition of these components may altered to achieve similar results.

In each of the mixing steps, it is preferred the that mixing be performed using a planetary mixer of the food preparation type, such as those marketed by the Hobart company under part number V1401. Such a mixer is preferred due to its ease of cleaning, range of mixing speeds, and completeness of mixing. However, it is noted that mixers of other types may be substituted to achieve similar results.

In some embodiments, it is desirable to mill the wet mixture after it has been initially mixed and prior to drying, and then remixing the wet mixture to eliminate any inhomogeneities. Such an intermediate milling step may be performed more than once, or not at all, depending upon the consistency of the mixture.

As noted above, the resulting flux powder is non-corrosive and non-hygroscopic, and is readily adapted for suspension within a paste or disposition within a brazing alloy to form a wire brazing composition.

Although the present invention has been described in considerable detail with reference to certain preferred versions thereof, other versions would be readily apparent to those of ordinary skill in the art. Therefore, the spirit and scope of the appended claims should not be limited to the description of the preferred versions contained herein.

What is claimed is:

1. A method of making a brazing flux compound comprising the steps of:

dispensing a desired amount of each of a plurality of ingredients;

first adding potassium bifluoride;

second adding boric acid on top of the potassium bifluoride;

first mixing the boric acid and potassium bifluoride to form a substantially smooth wet first paste;

third adding potassium tetraborate to the first paste;

second mixing the potassium tetraborate with the first paste to form a second paste;

fourth adding potassium fluoroborate to the second paste;

third mixing potassium fluoroborate with the second paste to form a third paste;

fifth adding potassium carbonate to the third paste;

fourth mixing until potassium carbonate is completely dissolved thus forming a fourth paste;

heating the fourth paste for a predetermined time at a predetermined temperature such that the said fourth paste is substantially dried into a substantially solid flux; and reducing the substantially solid flux to a powder.

2. The method of claim 1 further comprising the step of adding an amount of non-reactive liquid to at least one of said mixing steps as the paste in the corresponding mixing step begins to stiffen, said amount of non-reactive liquid being sufficient to cause the paste to retain a substantially smooth consistency.

3. The method of claim 2 wherein said non-reactive liquid is deionized water.

4. The method of claim 1 wherein said predetermined temperature of said heating step is between about 600 and about 700 degrees Fahrenheit.

5. The method of claim 4 wherein said predetermined temperature of said heating step is about 650 degrees Fahrenheit.

6. The method of claim 1 wherein the predetermined time of said heating step is between about 2 hours and about 6 hours.

7. The method of claim 6 wherein the predetermined time of said heating step is about 4 hours.

8. The method of claim 1:

wherein said first adding step comprises adding potassium bifluoride ranging from approximately 19% to 29% by weight;

wherein said second adding step comprises adding boric acid ranging from approximately 21% to 31% by weight;

wherein said third adding step comprises adding potassium tetraborate ranging from approximately 15% to 25% by weight;

wherein said fourth adding step comprises adding potassium fluoroborate ranging from approximately 21% to 31% by weight; and wherein said fifth adding step comprises adding potassium carbonate ranging from approximately 2.5% to 4.5% by weight.

9. The method of claim 8:

wherein said first adding step comprises adding approximately 24% by weight of potassium bifluoride;

wherein said second adding step comprises adding approximately 26% by weight of boric acid;

wherein said third adding step comprises adding approximately 20% by weight of potassium tetraborate;

wherein said fourth adding step comprises adding approximately 26% by weight of potassium fluoroborate; and wherein said fifth adding step comprises adding approximately 3.5% by weight of potassium carbonate.

10. The method of claim 1 further comprising the step of sixth adding boron and then fifth mixing said boron; said sixth adding step being performed at any time after said second mixing step and before said heating step.

11. The method of claim 10 wherein said sixth adding step comprises adding boron ranging from approximately 0.01% to 2.0% by weight.

12. The method of claim 1 wherein said reducing step comprises reducing the size of the flux to a powder of between about 20 mesh and about 325 mesh.

13. The method of claim 12 wherein said reducing step comprises reducing the size of the flux to a powder of between about 40 mesh and about 200 mesh.

14. The method of claim 1 wherein said reducing step comprises reducing the solid flux to a powder by a method selected from a group consisting of three roll milling, hammer milling, crushing, and pulverizing.

15. The method of claim 1 further comprising the steps of rolling the fourth paste and fifth mixing the fourth paste prior to said heating step.

16. The method of claim 1 further comprising the step of transferring the fourth paste into a container prior to the heating step such that the fourth paste fills the container to a height of between about one inch and about two inches.

17. The method of claim 1 wherein at least one of said mixing steps comprises the steps of first running a mixer, stopping the mixer, scraping sides and a bottom of a bowl and a mixer blade, and second running said mixer.

18. The method of claim 1 wherein said step of first adding potassium bifluoride further comprises the step of separating at least one clump of potassium bifluoride until only granules of potassium bifluoride remain.

19. A method of making a wire brazing composition comprising the steps of:
   making a brazing flux compound, wherein said step of making a brazing flux compound comprises the steps of:
      dispensing a desired amount of each of a plurality of ingredients; first adding potassium bifluoride;
      second adding boric acid on top of the potassium bifluoride;
      first mixing the boric acid and potassium bifluoride to form a substantially smooth wet first paste;
      third adding potassium tetraborate to the first paste;
      second mixing the potassium tetraborate with the first paste to form a second paste;
      fourth adding potassium fluoroborate to the second paste;
      third mixing potassium fluoroborate with the second paste to form a third paste;
      fifth adding potassium carbonate to the third paste;
      fourth mixing until potassium carbonate is completely dissolved thus forming a fourth paste;
      heating the fourth paste for a predetermined time at a predetermined temperature such that the said fourth paste is substantially dried into a substantially solid flux; and
      reducing the substantially solid flux to a powder flux;
   forming a silver brazing material into a desired shape;
   dispensing the powder flux onto a silver brazing material; and
   forming the silver brazing material and the powder flux into the wire brazing composition.

20. A method of making a brazing paste comprising the steps of:
   making a brazing flux compound, wherein said step of making a brazing flux compound comprises the steps of:
      dispensing a desired amount of each of a plurality of ingredients;
      first adding potassium bifluoride;
      second adding boric acid on top of the potassium bifluoride;
      first mixing the boric acid and potassium bifluoride to form a substantially smooth wet first paste;
      third adding potassium tetraborate to the first paste;
      second mixing the potassium tetraborate with the first paste to form a substantially creamy second paste;
      fourth adding potassium fluoroborate to the second paste;
      third mixing potassium fluoroborate with the second paste to form a third paste;
      fifth adding potassium carbonate to the third paste;
      fourth mixing until potassium carbonate is completely dissolved thus forming a fourth paste;
      heating the fourth paste for a predetermined time at a predetermined temperature such that the said fourth paste is substantially dried into a substantially solid flux; and
      reducing the substantially solid flux to a powder flux;
   forming a silver brazing material into a silver powder;
   combining the silver powder, the powder flux and a binder material; and
   mixing the silver powder, the powder flux and the binder material together to form the silver brazing paste.

* * * * *